(12) United States Patent
Minervini et al.

(10) Patent No.: US 8,141,583 B2
(45) Date of Patent: Mar. 27, 2012

(54) VALVE CONTROLLER

(75) Inventors: Leo Minervini, Saddle Brook, NJ (US);
Eric Jordan, River Edge, NJ (US);
Robert Endres, Verona, NJ (US)

(73) Assignee: Westlock Controls Corporation, Saddle Brook, NJ (US)

( * ) Notice: Subject to any disclaimer, the term of this patent is extended or adjusted under 35 U.S.C. 154(b) by 134 days.

(21) Appl. No.: 12/716,049

(22) Filed: Mar. 2, 2010

(65) Prior Publication Data

US 2010/0155632 A1 Jun. 24, 2010

Related U.S. Application Data

(62) Division of application No. 11/529,783, filed on Sep. 29, 2006, now Pat. No. 7,819,133.

(51) Int. Cl.
*F16K 37/00* (2006.01)
*F16K 31/14* (2006.01)
*F16K 31/12* (2006.01)

(52) U.S. Cl. ............ 137/556; 137/559; 251/14; 251/29; 251/81; 116/277

(58) Field of Classification Search .................. 137/553, 137/554, 556, 559; 251/14, 28, 29, 60, 81, 251/129.04, 230; 116/227, 285
See application file for complete search history.

(56) References Cited

U.S. PATENT DOCUMENTS

| | | | | |
|---|---|---|---|---|
| 630,278 A * | 8/1899 | Wiley | ........................... | 116/277 |
| 824,163 A * | 6/1906 | Whitney | ....................... | 116/277 |
| 2,020,833 A * | 11/1935 | Hansen | ........................... | 251/29 |
| 2,208,421 A * | 7/1940 | Hanna | .............................. | 251/29 |
| 2,373,654 A * | 4/1945 | Beekley et al. | ................. | 251/29 |
| 3,012,751 A * | 12/1961 | Hauser | ............................ | 251/60 |
| 3,446,241 A * | 5/1969 | Skoli | ............................ | 137/553 |
| 3,802,462 A * | 4/1974 | Trosch | ......................... | 137/556 |
| 3,910,308 A * | 10/1975 | Mack | ............................ | 137/553 |
| 4,046,350 A * | 9/1977 | Massey et al. | ................. | 137/556 |
| 4,494,566 A * | 1/1985 | Sinclair et al. | ................. | 137/556 |
| 4,872,482 A * | 10/1989 | Jarrett | ............................ | 137/554 |
| 5,223,822 A * | 6/1993 | Stommes et al. | ............. | 137/551 |
| 5,469,805 A * | 11/1995 | Gibbs | ............................ | 137/556 |
| 5,535,698 A | 7/1996 | Trevisan | | |
| 5,551,477 A * | 9/1996 | Kanno et al. | ................... | 137/553 |
| 5,890,515 A * | 4/1999 | Spiess et al. | .................. | 137/552 |
| 6,044,791 A * | 4/2000 | LaMarca et al. | .............. | 116/277 |
| 6,805,328 B2 * | 10/2004 | Filkovski et al. | ................ | 251/29 |
| 6,820,647 B1 * | 11/2004 | Grecco et al. | .................. | 137/552 |
| 7,647,940 B2 * | 1/2010 | Minervini et al. | ......... | 137/454.6 |

FOREIGN PATENT DOCUMENTS

| | | |
|---|---|---|
| DE | 19528081 A1 | 2/1997 |
| EP | 0584975 A1 | 3/1994 |
| EP | 0622574 A2 | 11/1994 |
| GB | 2229254 A | 9/1990 |

* cited by examiner

*Primary Examiner* — John Rivell

(57) ABSTRACT

A controller for controlling a valve is disclosed including a manifold assembly, a valve position indicator and a trigger assembly. An operating media distribution system is disposed in the manifold assembly and an electronic control unit is disposed in the controller. The electronic control unit operates at least one electromagnetic valve to control operating media flow via the operating media distribution system to activate an actuator which opens or closes the valve. The trigger assembly includes a cylinder adapted to receive an actuator shaft and provide a self setting mechanism corresponding to the stroke length of the actuator shaft.

41 Claims, 10 Drawing Sheets

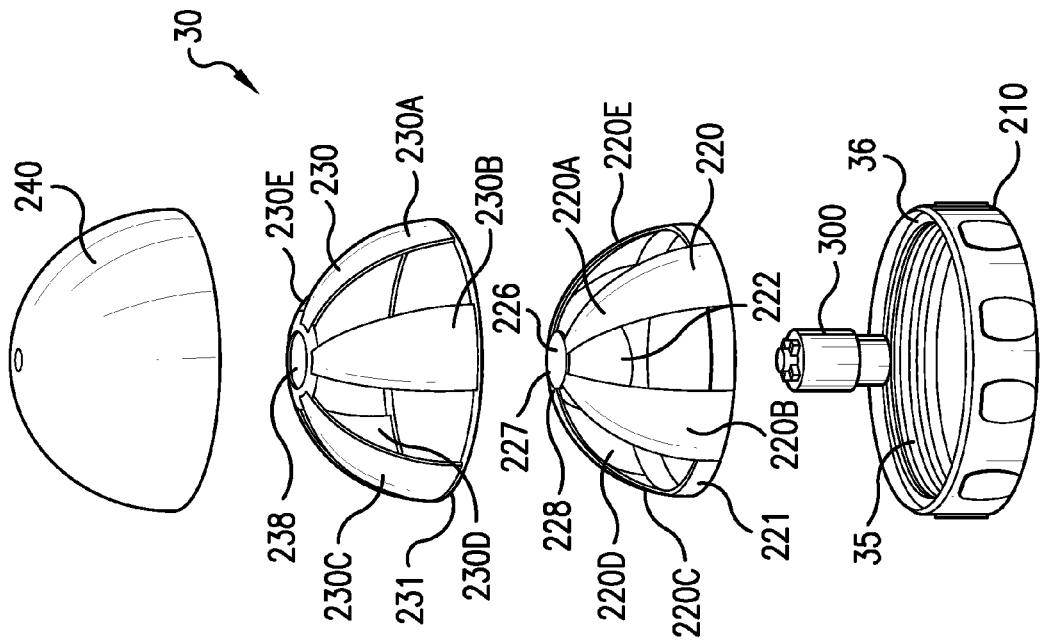
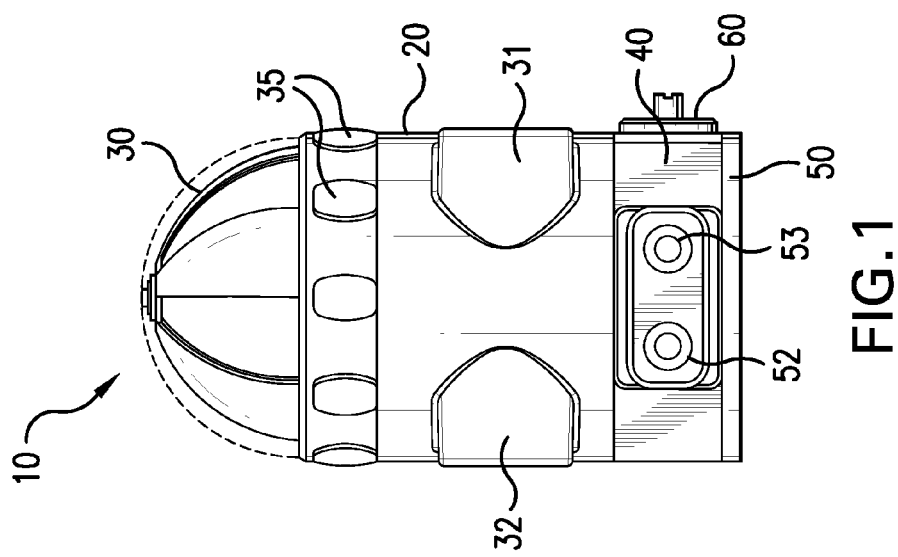

US 8,141,583 B2

VALVE CONTROLLER

This application is a divisional application of U.S. Ser. No. 11/529,783 filed Sep. 29, 2006, which is currently pending.

FIELD OF THE INVENTION

The present invention relates generally to valve controllers, and further to an integrated valve controller for use with diaphragm valves and associated actuators. The present invention also relates to a visual indicator providing signals indicative of the position of a valve and to a self setting method associated with the controller.

BACKGROUND OF THE INVENTION

Different types of process valves are employed for different purposes. For example, a diaphragm valve may be used in the chemical, pharmaceutical and food industries. A valve controller is employed to control the position of a valve based on pneumatic pressure and may also provide a visual indication of such position. These visual indicators sometimes extend above the plane of the controller (e.g. pop-up indicators), thereby increasing the space required to operate the controller. Typically, many hundreds and sometimes thousands of valves are used in a processing plant where each of these valves has an associated controller. Thus, size of the controller is a concern in order to reduce space within the plant. Valve controllers work in combination with valve actuators. Usually, the shaft of an actuator is mechanically connected to the controller. This mechanical connection causes installation complexity and maintenance problems over the life of the actuator. In addition, if an actuator must be replaced, the controller must be re-set to the particular actuator stroke and mechanically re-connected. The above-referenced drawbacks and others are overcome by the present invention described herein with reference to the detailed description, drawings and appended claims.

SUMMARY OF THE INVENTION

The present invention relates to a compact valve controller with a self-setting mechanism and a visual indicator or beacon. The valve controller may be used to control a diaphragm or other linear process valve and employed in an environment where visual inspection of the position of a valve is needed. The controller is typically mounted on top of the actuator according to an actuator mounting pattern and is adapted to receive the shaft of the actuator.

The valve controller may have an enclosure with a visual indicator mounted thereon. The visual indicator provides a brightly colored vain to indicate the valve position (e.g. open or closed). The enclosure houses a cylinder having an internal cavity configured to receive the actuator shaft. When the stroke of an actuator shaft is activated in response to a signal to open or close the valve, the shaft vertically traverses at least a portion of the vertical length of the cylinder. A plunger disposed within the cylinder engages a first end of the actuator shaft. The plunger is forced upward by the actuator shaft and engages grooves in the cylinder cavity. The vertical distance the plunger traverses within the internal cavity corresponds to the distance traversed by the actuator shaft within the cylinder cavity which also corresponds to the operating stroke of the actuator shaft. The present invention avoids the need for a mechanical connection between the actuator shaft and the controller.

The controller may also include an operating media distribution system disposed in the enclosure. The distribution system may include a distribution cartridge exchangeably disposed in a manifold cavity. A spool assembly is disposed in the cylinder and is displaced between a first and a second configuration relative to the cylinder. The first and second configurations correspond to valve position. An electronic control unit is also disposed in the enclosure and operates an electromagnetic valve to control operating media flow in the operating media distribution system corresponding to the first and second configurations. Further details of the system are described to specify various illustrative uses of the valve controller in accordance with the present invention.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIG. 1 illustrates a profile view of a valve controller according to an embodiment of the present invention.

FIG. 2 is a perspective view of a beacon assembly of the controller illustrated in FIG. 1 in accordance with one embodiment of the present invention.

DETAILED DESCRIPTION OF THE PREFERRED EMBODIMENTS

Figure 3A:
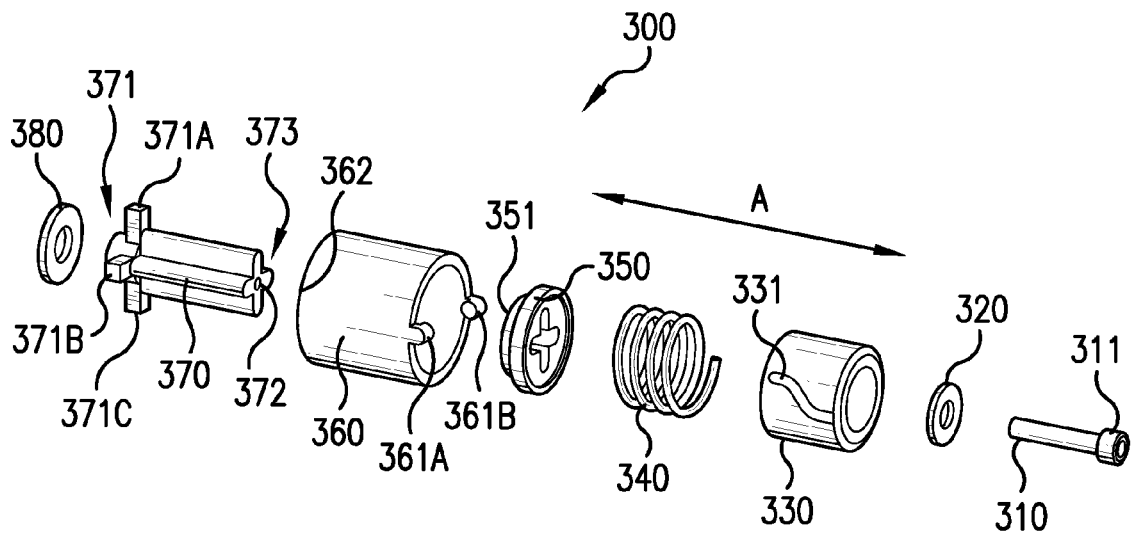
FIG. 3 is a perspective view of cam assembly illustrated in FIG. 1 in accordance with one embodiment of the present invention.

FIG. 1 illustrates an exemplary embodiment of a valve controller 10 to be mounted on a valve or pneumatic valve actuator (not shown). Controller 10 includes trigger enclosure or housing 20, beacon assembly 30, manifold 40 and mounting plate 50. Housing 20 is cylindrical in shape and beacon assembly 30 includes circumferential indentations 35 for gripping purposes and first and second electrical conduit ports 31 and 32 to provide electrical supply to and from controller 10. Ports 31 and 32 can be adapted to connect to, for example, ½" NPT or like conduit. The beacon assembly 30 and manifold 40 define an enclosure in which all for mechanical and electronic components are housed to avoid exposure to operative conditions.

FIG. 2 illustrates a perspective view of beacon assembly 30 to indicate the position or operating state of a valve controlled by controller 10. For example, beacon assembly 30 may provide a distinct visual signal for a process valve operating under normal conditions in an open position, closed position or an intermediate position there between. Assembly 30 comprises threaded ring 210, cam assembly 300, rotating vain 220, deflector 230 and clear dome 240 which all work together to provide a visual indication of valve position. Vain 220 includes sleeve portion 222 which extends downward from receiving aperture 228 and vain shields 220A, 220B, 220C, 220D and 220E which extend from receiving aperture 228 to vain rim 221. Cam assembly 300 is disposed within sleeve portion 222. Deflector 230 also includes a receiving aperture 238 and deflector shields 230A, 230B, 230C, 230D, 230D, and 230E which extend from aperture 238 to rim 231. Vain 220 engages dome 240. "Aperture," as used herein refers to an opening allowing passage through or in and out. The term "engage" as used herein means a non-permanent connection between a plurality of parts. Deflector 230 overlays vain 220 and engages threaded ring 210. Clear dome 240 overlays deflector 230 and vain 220 and engages threaded ring 210. Alternatively, dome 240 may be integrally molded with ring 210 to create an air tight relationship between the parts. Dome 240 protects deflector 230, vain 220 and cam assembly 300 from corrosion and unwanted particle buildup between deflector shields 230A, 230B, 230C, 230D, 230D, 230E and vain shields 220A, 220B, 220C, 220D and 220E. A reduced number of shields may be utilized as long as a color contrast is sufficient for an operator to visually inspect. Alternatively, deflector 230 may be obviated by configuring dome 240 to provide contrasting color with vain shields 220A-220E. For example, deflector 230 may be ink stamped or painted with such a contrasting color.

FIG. 3A is a perspective view of cam assembly 300 which comprises a retainer 310, washer 320, cam 330, spring 340, spring cup 350, rotating drum 360 and guide 370. Guide 370 receives pin 310 via threaded cavity 372 with washer 320 forming a resistive seal between head 311 of pin 310 and cam 330. Drum 360 includes pin 361A which engages channel track 331 of cam 330 (pin 361B engages an additional channel track, not shown, of cam 330). Spring 340 is housed within drum 360 and is disposed between spring cup 350 and cam 330. As spring 340 is engaged, the force applied to cam 330 causes cam 330 to traverse channel tracks 331 guided by pins 361A and 361B in the direction indicated by arrow A. Drum 360 includes an interior flange at end 362. Movement of drum 360 along channels 331 causing spring cup 350 to move along guide 370 in the direction indicated by arrow A and engage interior flange at end 362 of drum 360. FIG. 3A is a top plan view of guide 370 as seated within drum 360. Guide 370 defines a cross or X pattern (alternative patterns may also be used) having a top portion 371 with raised fittings 371A, 371B, 371C, and 371D. Guide 370 may also be integrally formed with drum 360 in order to retain cam assembly 300 and vain 220 within dome 240. Bottom portion 373 of guide 370 is disposed through spring cup 350 which engages spring 340. Top portion 351 of spring cup 350 engages raised fittings 371A, 371B, 371C, and 371D of guide 370. Spacer 380 is disposed between top portion 371 and vain 220.

Referring back to FIG. 2, drum 360 is press fit, or otherwise engages the interior portion of sleeve 222 of vain 220. Cam 330 moves upward toward dome 240 along guide 370 as a result of actuation to open or close the associated valve. Pins 361A and 361B of drum 360 traverse respective channels 331 of cam 330 causing drum 360 to rotate clockwise within sleeve 222 of vain 220 which turns or rotates vain shields 220A-220B. Channel tracks 331 are shown as an elongated "S" configuration, however channels 331 may also have alternative configurations such as various angled paths employed to absorb initial and end movement of drum 360 along channels 331. Regardless of the particular geometry of channel 331, the purpose of channels 331 is to guide pins 361A and 361B of drum 360 to provide sufficient rotation of drum 360 to turn vain 220. In this manner, upward movement of cam assembly 300 rotates vain shields in relation to deflector shields 230A-230C which provides a visual indication of valve position. In contrast to previous "pop-up" type indicators, displacement of cam assembly 300 can be as little as ¼" while still providing sufficient rotation of vain 220 to provide a visual indicator of valve position.

Figure 4:
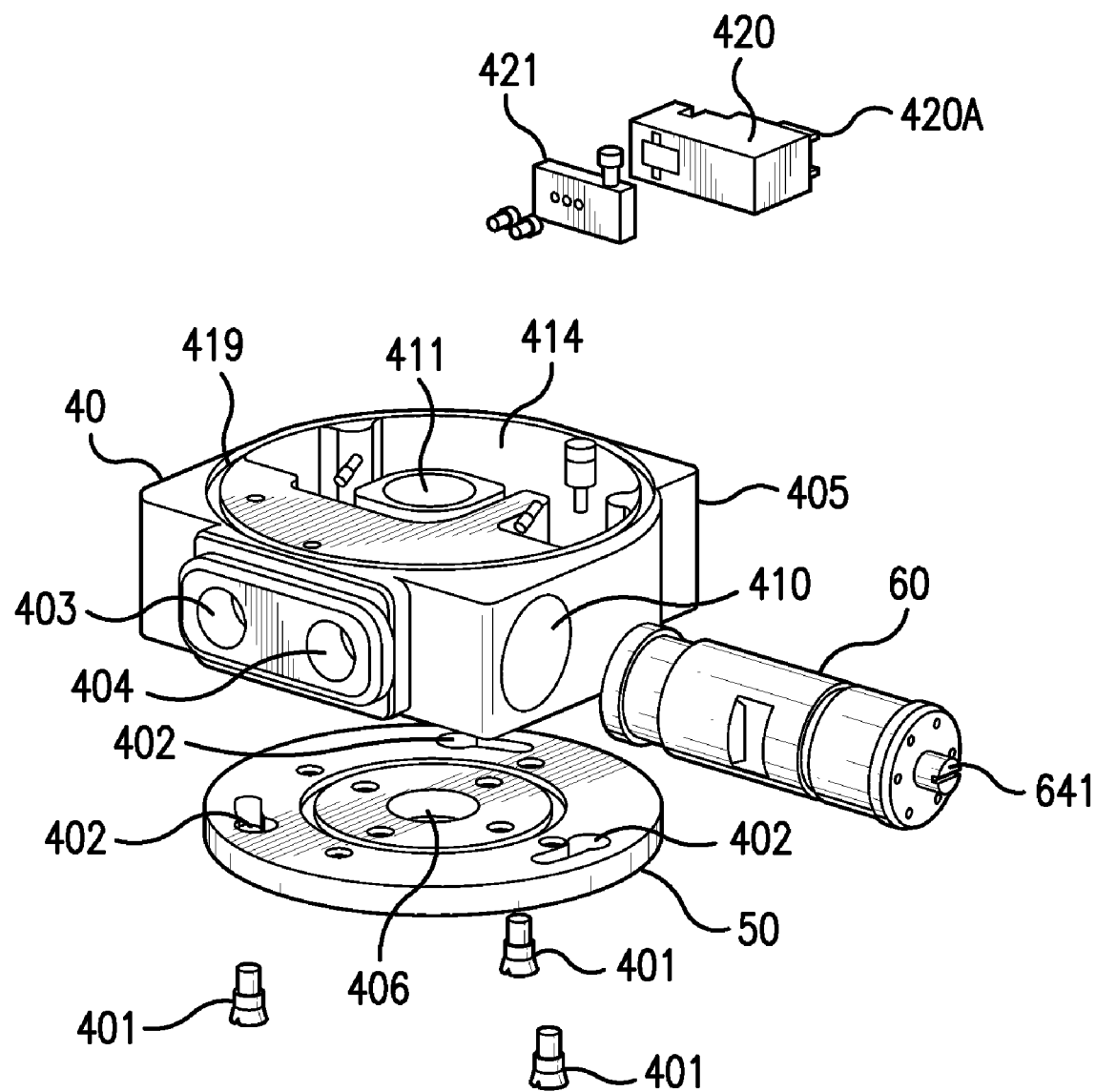
FIG. 4 is a perspective view of a manifold assembly in accordance with one embodiment of the present invention.

FIG. 4 is a perspective view of manifold 40, mounting plate 50 and operating media distribution cartridge 60. Manifold 40 is attached to mounting plate 50 via a plurality of threaded fasteners 401 and alignment holes 402. A respective plurality of threaded holes is configured on the underside of manifold 40. Mounting plate 50 also includes central opening 406 through which an actuator rod is received. Similarly, manifold 40 also includes a centrally located opening 411 which is aligned with opening 406 for an actuator rod (not shown).

Manifold 40 of the valve controller 10 includes at least three ports: an inlet air supply port 403, an output or energize port 404 for valve actuator operation, and an exhaust port 405 located on the other side of manifold 40 approximately transverse to energize port 404. Ports 403, 404 and 405 are adapted to connect to ¼ inch NPT or similar connection and exhaust port 405 may also be adapted to receive a muffler type device to reduce the sound of air escaping from manifold 40. Circular channel 419 receives an o-ring to provide a seal between manifold 40 and enclosure 20. The manifold 40 is preferably formed as a monolithic member. As it is used herein, the term "monolithic" refers to a single, uniform whole member, which may be formed of a homogeneous material. Preferably, the manifold 40 is cast, molded and/or machined as a monolithic unit of the same material. Alternatively, the manifold 40 may be an assembly of a plurality of portions that are individually cast, molded and/or machined, and then joined by one or more fastening techniques including threaded fasteners, thermal bonding and/or adhesive bonding. Additionally, when a plurality of portions and one or more fastening techniques are assembled, the manifold 40 may alternatively be a composite or combination of two or more different materials, e.g., metal threaded fasteners may be used to assembly a plurality of polymeric portions.

The manifold 40 can be made of any suitable material, such as for example, metal, alloy, composite, and plastic materials. At ambient temperatures, the block material and internal cavity configuration should be capable of containing and transporting operating media, for example, non-lubricated air filtered to about 20 microns (or some other fluid), at temperatures between about −40 degrees Fahrenheit to 180 degrees Fahrenheit and at pressures of between about 20 to 120 pounds per square inch gauge.

Manifold 40 includes interior chamber 414 which houses electromagnetic valve 420 and pressure tap plate 421. Electromagnetic valve 420 functions like a transistor thereby allowing a relatively small signal to control the opening and closing of a relatively large valve via a pneumatic actuator. Generally, a small current is applied to electromagnetic valve 420 to direct a large amount of high pressure air, typically at around 100 psi (7 bar, 0.7 MPa, 0.7 MN/m$^2$) from supply port 403 through media cartridge 60 to control opening and closing of an associated process valve. Electromagnetic valve 420 is preferably a solenoid valve with connector 420A, but may also be a micro-poppet or piezo valve. Generally in operation, air is supplied to manifold 40 via supply port 403. Solenoid valve 420, in response to a control signal via connector 420A, allows the supply air to activate media cartridge 60 and provides air to energize port 404. This air is supplied to an actuator which opens and/or closes a linear valve. The solenoid switch or valve moves in response to current induced from a supplied electrical signal to a coil. This movement either opens or closes the switch.

Figure 5A:
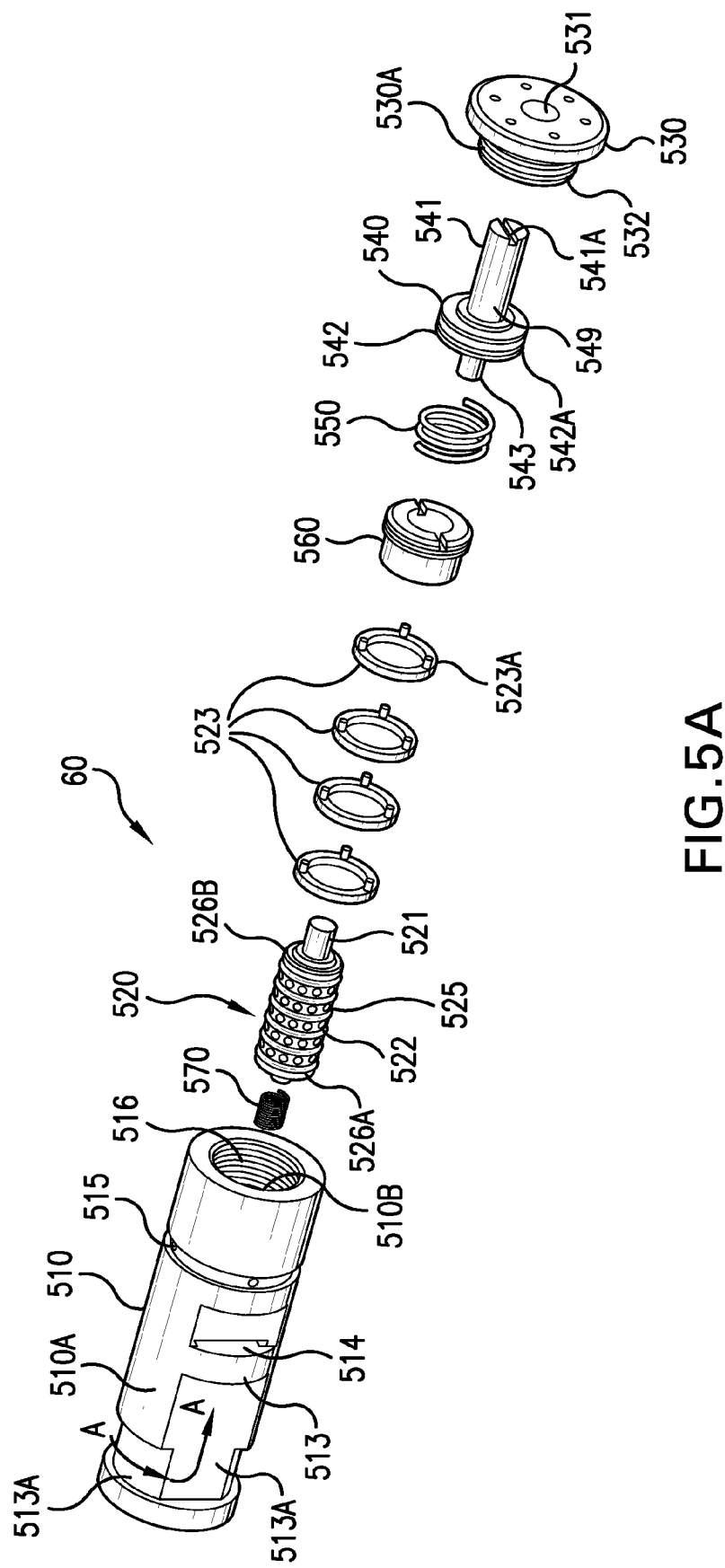
FIGS. 5A-5D are various views of the media cartridge shown in FIG. 4 in accordance with one embodiment of the present invention.
Figure 5B:
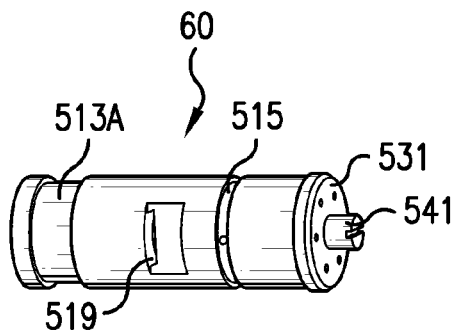

Manifold 40 includes cavity 410 in which operating media distribution cartridge 60 is received. FIGS. 5A-5D are various views of media cartridge 60. FIG. 5A is a perspective view of a partitioned media cartridge 60 which includes a cylinder 510, spool bias spring 570, spool valve assembly 520, spool rings 523, spool retainer 560, spring 550, external manual override plunger 540, and cartridge cap 530. The cylinder 510 extends longitudinally along a cartridge axis and has an outer surface 510A and an outer surface 510B. Alternative outer surface configurations may be employed to seal these surfaces with internal cavity 410. Supply aperture 513 and exhaust aperture 514 penetrate cylinder 510 and thereby extends between and connects the outer surface 510A and inner surface 510B. Similarly, FIG. 5B, which illustrates a perspective view of cartridge 60 from the opposite side of that shown in FIG. 5A, includes energize or output port 519 disposed along the longitudinal axis of cartridge 60 between outside surface cavity 513A and circumferential supply groove 515.

Returning to FIG. 5A, cylinder 510 includes a longitudinal central bore 516 which receives spool valve assembly 520 and a threaded end portion 510B that receives both spool retainer 560 which retains spool assembly within cylinder 510 and cylinder end cap 530. The spool assembly 520 is displaced between first and second configurations relative to cylinder 510 in response to operating media received via a signal from electromagnetic valve 420 as described in more detail below.

Supply aperture 513 receives operating media (e.g. air) from supply port 403 around the outside surface cavity 513A in the direction referenced by arrow A. Outside surface cavity 513A directs the operating air from port 403 around outer surface 510A into supply aperture 513. Cylinder 510 includes a circumferential supply groove 515 which receives supply from port 403 when solenoid valve 420 receives an activation signal. In the absence of an activation signal from solenoid 420, the supply air from port 403 is prevented from passing to supply groove 515 through solenoid 420.

Figure 5C:
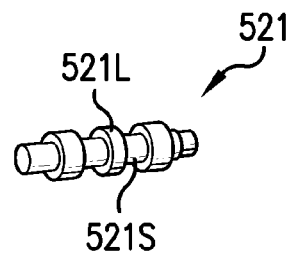

Spool assembly 520 preferably includes a centrally disposed spool 521 that extends along the cartridge axis, an annular sleeve 522 that circumscribes the spool 521, and a plurality of spacers 523 that circumscribe the annular sleeve 522. Spool 521 as shown in FIG. 5C includes alternating large diameter bands 521L and small diameter bands 521S that circumscribe the longitudinal axis of spool 521. Annular sleeve 522 includes a plurality of sets of radial perforations 525 and a plurality of sleeve O-rings 526A disposed along the longitudinal axis of spool 521. Spacers 523 engage the inner surface 510B of cylinder 510.

Spring 570 biases spool 521 with respect to cylinder 510 such that in the absence of operating media pressure, spool 521 will be displaced to a nominal configuration within cylinder 510. The displacement of spool 521 and the resultant positioning of the small diameter bands 521S with particular sets of the radial perforations 525 establishes fluid communication between supply port 403 and energize or output port 519. Displacement of spool 521 in cylinder 510 is controlled by the solenoid valve or micro-poppet 420 selectively diverting operating media to and from the associated poppet cavities to ultimately control the position of the respective process valve shafts.

Manual override plunger 540 is disposed within cylinder 510 in axial relationship between spring 550 and treaded portion 530A of cap 530 and biases the plunger 540 toward end cap 530. Plunger 540 includes a first end 541 having slot 541A which may receive a flat slotted tool. Plunger 540 includes ring portion 542 disposed between first end 541 and second end 543 and a plunger O-ring 542A used to prevent air from entering cylinder 510 via cap 530 through aperture 531. First end 541 is disposed through centrally located aperture 531 in end cap 530 which extends beyond a side wall of manifold 40 as shown in FIG. 4 and is accessible by an operator. Energize groove 515 is aligned between last spacer 523A and plunger 540. Upon application of a force against first end 541 toward cylinder 510, spring 550 exerts an opposing resistive force against ring 542. A pin 532 within threaded portion of cap 530 engages channel 549 disposed on plunger 540. As shown, channel 549 is curved thereby rotating plunger 540 into a locked position and maintaining spool assembly 520 in an active position within cylinder 510. Second end 543 of plunger 540 contacts spool 521 thereby displacing spool 521 in cylinder 510. Displacement of spool 521 causes radial perforations 525 to receive such air via port 403 and electromagnetic valve 420 to control opening and closing of an associated process valve. Once the process valve is either opened or closed, plunger 540 may be rotated by an operator engaging pin 532 with groove 549 preventing plunger 540 from returning to its nominal position. In addition, plunger 540 can be rotated by the operator thereby preventing plunger end 543 from displacing spool 521. This effectively removes manual override operation.

Figure 5D:
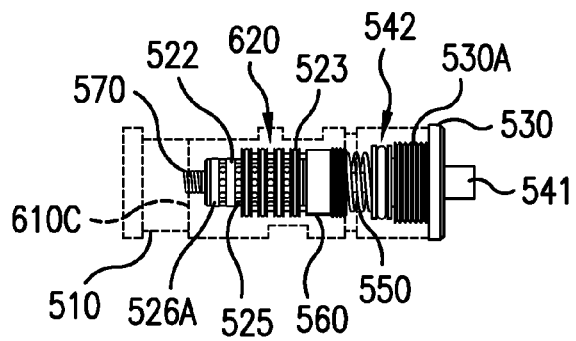

FIG. 5D illustrates the above components within cylinder 510. In particular, first end 541 of plunger 540 is disposed within cap 530 and protrudes a distance away from cylinder 510. Second end 543 of plunger 540 is positioned within spring 550 such that one end of spring 550 abuts ring portion 542 of plunger 540. The other end of spring 550 abuts spool retainer 560. One end of spool assembly 520 communicates with end 543 of plunger 542 through spool retainer 560. O-ring 542A of plunger 542 creates an air tight seal between plunger 542 and the inside surface 510B (shown in FIG. 5A) of cylinder 510. Spring 570 is disposed between interior cylinder support 610C and spool assembly 620.

Figure 6:
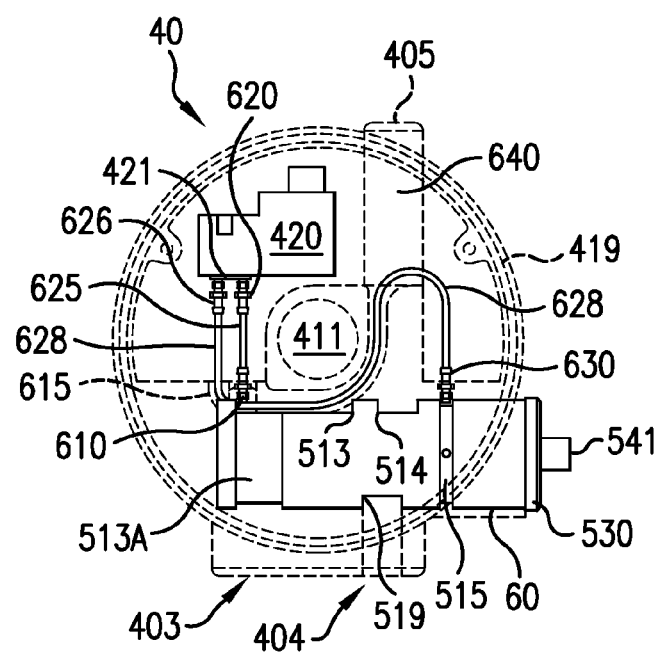
FIG. 6 is a top plan view of a manifold illustrating operating media pathways in accordance with one embodiment of the present invention.

FIG. 6 is a top plan view of manifold 40 illustrating operating media pathways 625, 628 and the configuration of media cartridge 60 within cavity 410. Pressure tap 610 communicates, via cavity wall 615, with supply port 403. Operating media, e.g. air, is received by pressure tap 610 from port 403 around cartridge 60. The air is supplied from tap 610 to solenoid tap 620 via tube 625. In the absence of a signal to open or close the associated process valve, the air does not pass through solenoid 420 to output tap 626.

Upon receipt of a control signal to either open or close the process valve, the air passes through solenoid 420 to tap 626 into tube 628 which is connected at a first end to tap 626 and at a second end to supply groove tap 630. Tubes 625 and 628 may be, for example made from plastic or other composition capable of maintaining adequate pressure to displace spool assembly 520 within media cartridge 60. Although the placement of tube 625 is substantially straight between taps 610 and 620 and tube 628 bends around centrally located manifold opening 411, alternative paths may be utilized as long as the bend radius of the material used for the tubes is sufficient to avoid compromising the transmission integrity of the tube between ports. The application of air to circumferential supply groove 515 via tap 630 displaces spool assembly 521 against spring 570 to allow radial perforations 525 to direct air to energize or output port 404 of manifold 40. This air is supplied to an actuator connected to controller 10 which opens or closes an associated process valve. Once the desired valve stroke is complete, the air supplied to the actuator must be released through controller 10. Cartridge exhaust aperture 514 is aligned with manifold exhaust port 405 via exhaust chamber 640 and energize aperture 519 is aligned with energize port 404. Accordingly, air supplied to the actuator is exhausted through port 405 via aperture 514.

Figure 7A:
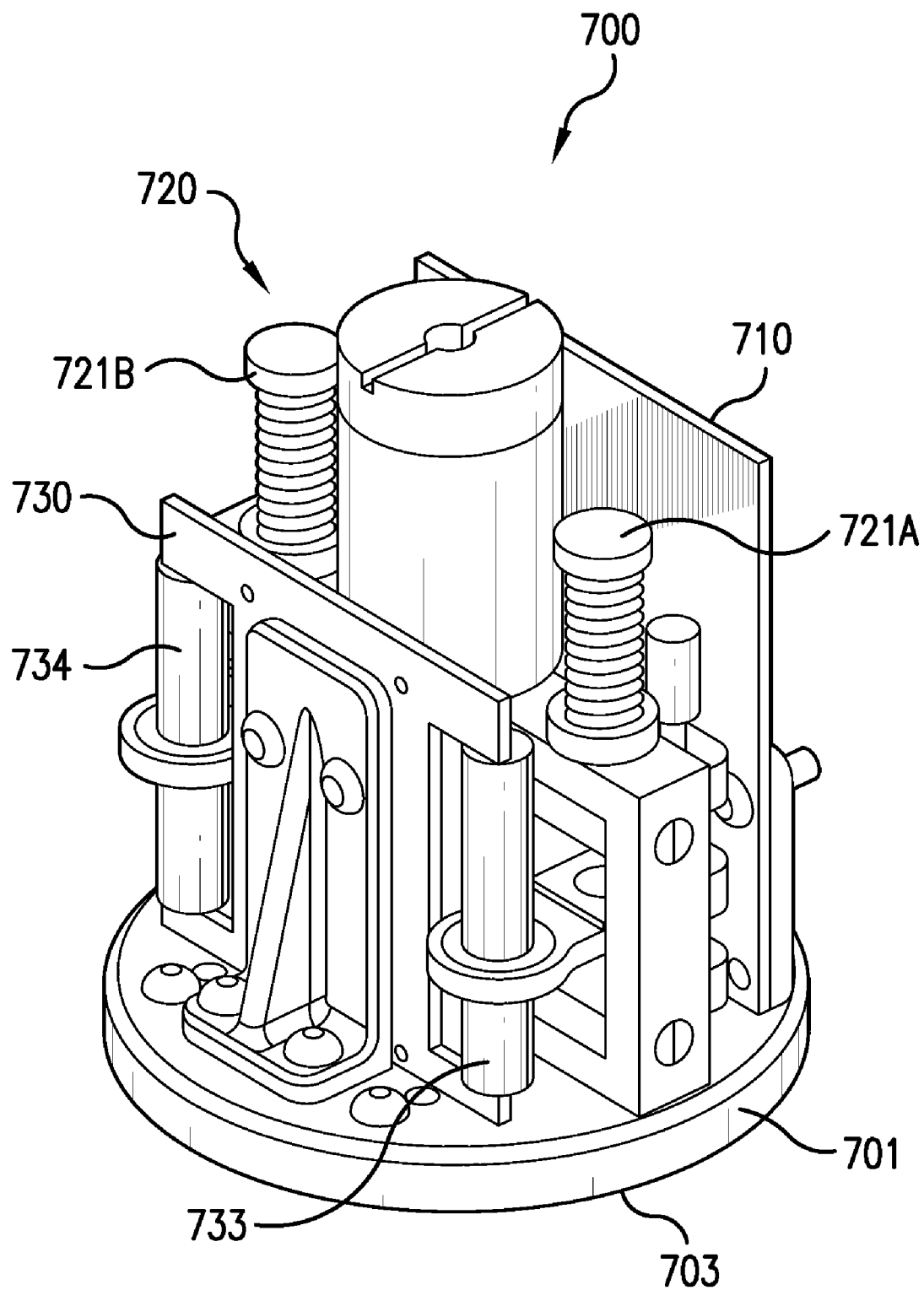
FIGS. 7A-7D are various views of a trigger assembly in accordance with one embodiment of the present invention.
Figure 7B:
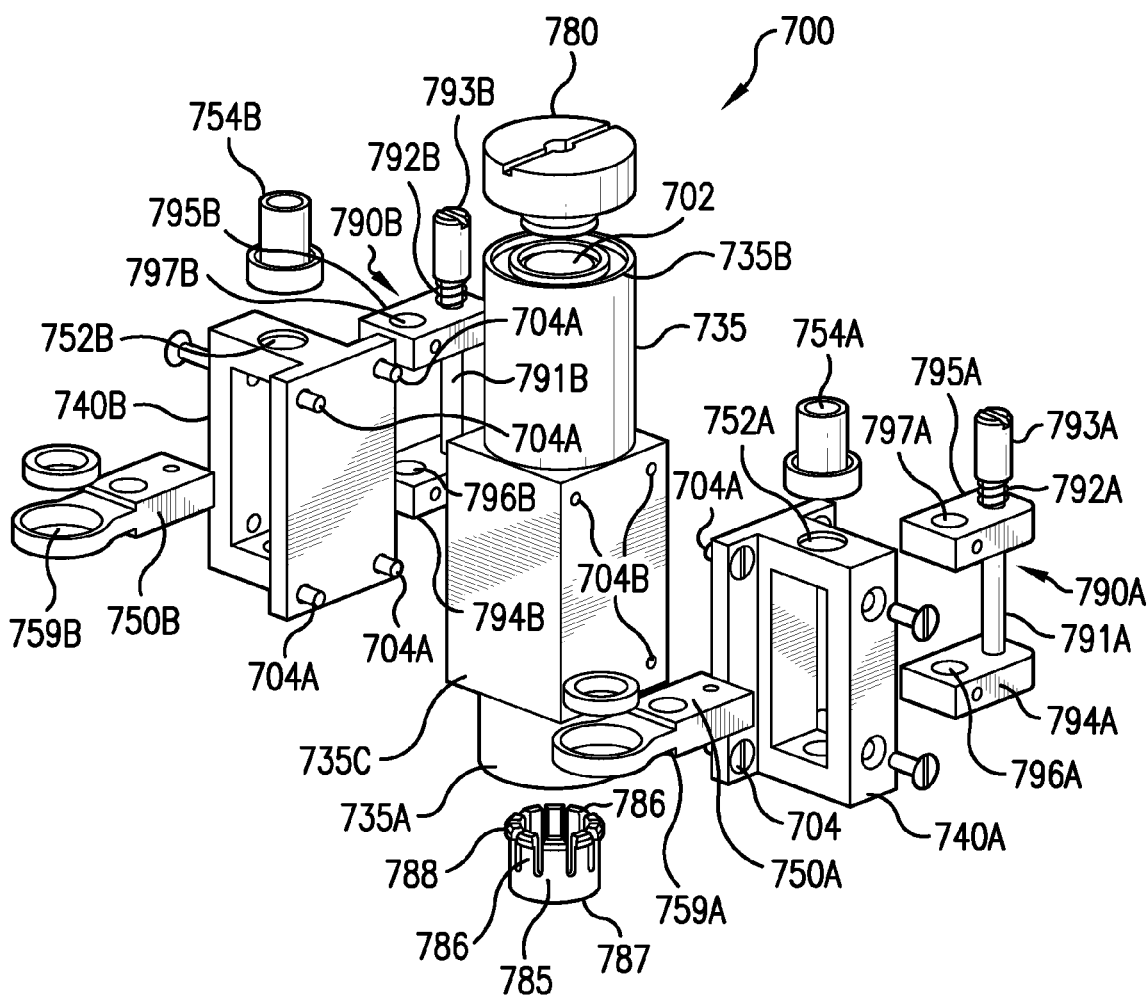
Figure 7C:
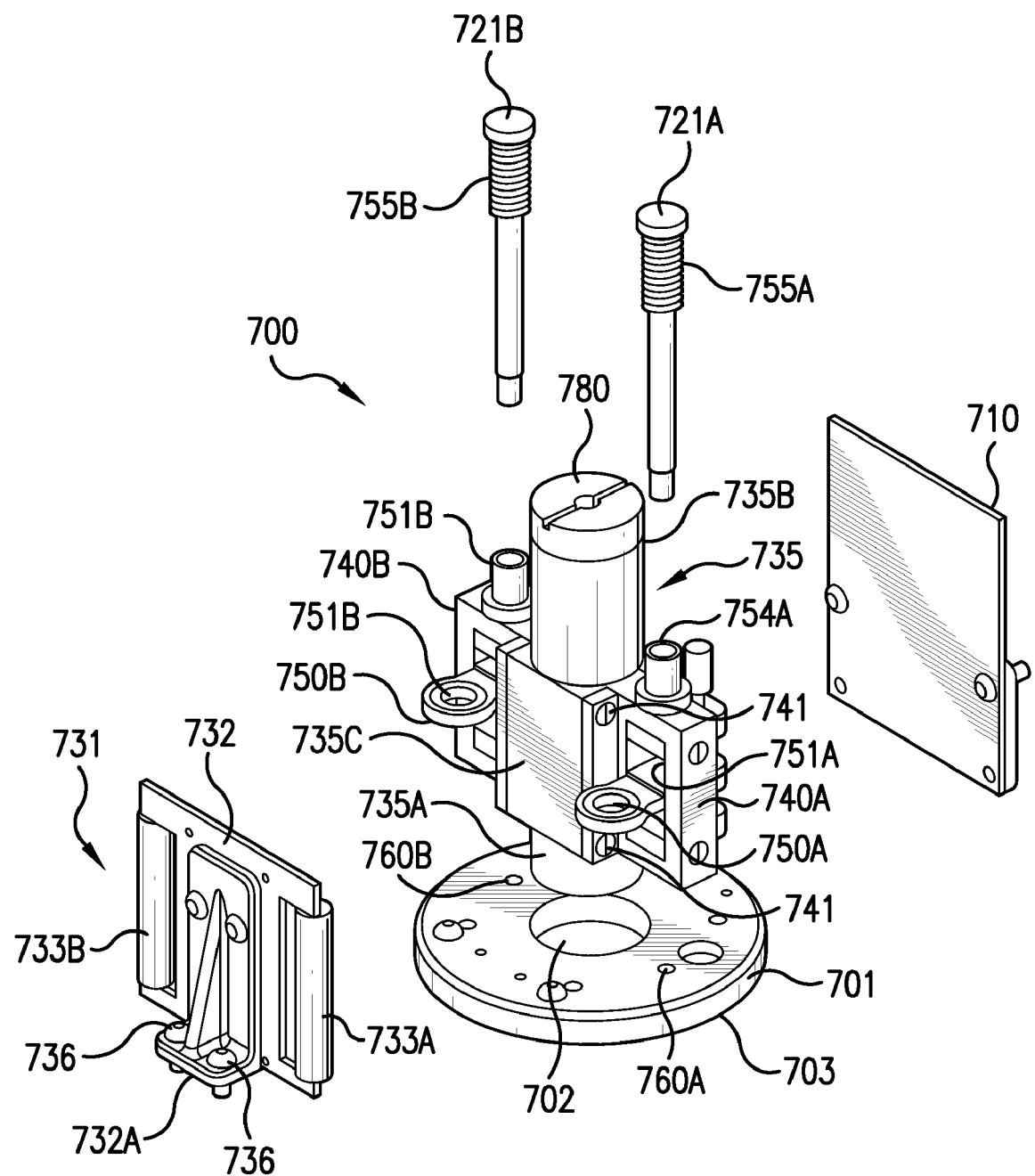

FIGS. 7A-7C illustrate a trigger assembly 700 which is disposed between manifold 40 and beacon 30 within trigger housing 20. FIG. 7A is a perspective view of a trigger assembly 700 including trigger 720, electronic control unit 710 and switch assembly 730 all mounted on mounting plate 701. Trigger assembly 700 is mounted on manifold 40 where mounting plate flange 703 is positioned within enclosure 20. Electrical contacts from circuit network card 710 are connected to and from solenoid 420.

Figure 3B:
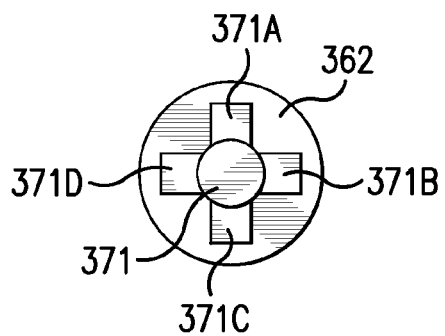

FIG. 7B is a partitioned perspective view of trigger 720 including cylinder 735, trigger brackets 740A, 740B and adjustment means 790A and 790B. Brackets 740A and 740B have substantially similar structure, but differ with respect to positioning with switch assembly 730. Similarly, adjustment means 790A and 790B have substantially similar structure, but differ with respect to connection to brackets 740A and 740B respectively. Cylinder 735 has a first end 735A, second end 735B and a mid-section 735C and is adapted to receive an actuator shaft or rod through internal cavity 702. First and second ends 735A and 735B have a substantially circular cross section and mid section 735C has a substantially quadrangular cross section. Cylinder 735 is attached to brackets 740A and 740B at mid-section 735C via fasteners 704A and bores 704B. Alternatively, brackets 740A and 740B may be integrally formed with the outside of cylinder 735. Threaded cylinder cap 780 is connected to end 735B of cylinder 735 and communicates with cam assembly 300 shown in FIG. 3. Cap 780 may be removed to access plunger 785. Plunger 785 is substantially circular in cross section and includes a bottom portion 787 and a plurality of teeth 786 extending therefrom. Each one of the plurality of teeth 786 have extended portions 788. Plunger 785 is preferably made from plastic or other material capable of allowing teeth 786 to bend inwardly. Plunger 785 is positioned within internal cylinder cavity 702 which includes a plurality of grooves 770 which communicate with extended portions 788 as described in more detail below with reference to FIG. 7C. The tension to displace plunger 785 along internal cavity grooves is greater than that which is required to vertically displace trigger assembly 700 (as described below) to effectuate a self setting function of controller 10.

First and second switch triggers 750A and 750B are disposed within brackets 740A and 740B respectively and are secured using guide pins 721A and 721B. Guide pins 721A and 721B are positioned through holes 752A and 752B of brackets 740A and 740B. Adjustment means 790A and 790B are attached to brackets 740A and 740B respectively via guide pins 721A and 721B through holes 796A, 796B and 797A, 797B. Adjustment means 790A and 790B include adjustment rods 791A, 791B, bias springs 792A, 792B and adjustment caps 793A and 793B. Adjustment means 790A and 790B are each used to adjust the trigger mechanism of switches 733 and 734 based on the type of actuator used.

FIG. 7C illustrates a perspective view of trigger assembly 700, network card 710, mounting plate 701 and switch assembly 731. Plate 701 includes a flange 703 which is mounted in side enclosure 20. Aperture 702 is aligned with manifold opening 411 and central opening 406 of mounting plate 50 as shown in FIG. 4. Cylinder 735 is adapted to receive an actuator shaft or rod through aperture 702, opening 411 and 406 which is used to open and close an associated linear process valve. Cylinder 735 is mounted to plate 701 on a first longitudinal side by mounting bracket 740A and on a second longitudinal side by mounting bracket 740B by fasteners 741.

Switch assembly 731 includes a first and second switch 733A and 733B disposed within bracket 732 and mounted to plate 701 via mounting portion 732A and fasteners 736. Switches 733A and 733B may be, for example, glass bifurcated switches, but other known switch types may also be used. Switches 733A and 733B are electrically connected to card 710 using known techniques. Switches 733A and 733B are positioned within triggers 750A and 750B through apertures 759A and 759B respectively where triggers 750A and 750B are magnetically configured to work in combination with switches 733A and 733B. Although switch triggers 750A and 750B are shown as having a substantially circular shape, alternative configurations such as a "horse-shoe" or semi-circular shape may also be employed such that a magnetic field is induced between the triggers (750A, 750B) and the switches (733A, 733B).

As stated above, switch assembly 731 is fixedly attached to plate 701 via fasteners 736. Each guide pin 721A and 721B is threadedly attached to plate 701 via receiving holes 760A and 760B and includes bias springs 755A and 755B. Each guide pin 721A and 721B is positioned through mechanical stops 754A and 754B, each bracket 740A and 740B, as well as each trigger 750A and 750B. Mechanical stops 754A and 754B are each disposed between springs 755A, 755B and brackets 740A and 740B. Alternatively, mechanical stops 754A and 754B may be replaced with reconfigured guide pins 721A and 721B having a stepped shoulder to perform the same function as the mechanical stops 754A and 754B. As an actuator shaft moves vertically upward through opening 411 and aperture 702, it engages plunger 785. The resistive force necessary to vertically displace plunger 785 within internal cylinder cavity 702 is greater than the force necessary to vertically displace trigger assembly 700 along guide pins 721A and 721B.

Previously, when a controller is connected to an actuator, a mechanical connection between the actuator shaft and the controller trigger assembly was required to set the opening and closing range of the associated valve. One reason for this manual mechanical connection was based on manufacturing variances in each actuator stroke. The controller of the present invention avoids this mechanical connection and self sets the required stroke range to indicate opening and closing of the valve. In particular, when a controller in accordance with the present invention is utilized with a linear actuator, a signal is sent to solenoid 420 to open the valve and an actuator shaft moves toward internal cylinder cavity 702 and engages plunger 785. During the initial self setting cycle of the controller, (i.e. to determine the range of the actuator stroke) plunger 785 is positioned toward end 735A of cylinder 735 and plunger 785 resists the upward movement of the actuator shaft allowing trigger assembly 700 to be displaced approximately ¼" along guide pins 721A and 721B. Because triggers 750A and 750B are fixedly connected to cylinder 735, the triggers are also displaced the same approximate distance. This upward movement of trigger 750A and 755B induces a magnetic field which triggers switches 733A and 733B. A signal is sent to network card 710 indicating that the valve is open. Switch 733A is used to send a signal to card 710 as a result of the upward movement of actuator shaft within cylinder 735 to indicate the opening of a valve. Switch 733B is used to send a signal to card 710 as a result of the downward movement of the actuator shaft within cylinder 735 to indicate the closing of the valve. Once brackets 740A and 740B engage mechanical stops 754A and 754B respectively, upward movement of trigger assembly 700 stops and the actuator shaft applies sufficient force to plunger 785 to move the plunger vertically upwards in cavity 702 from end 735A toward end 735B.

Figure 7D:
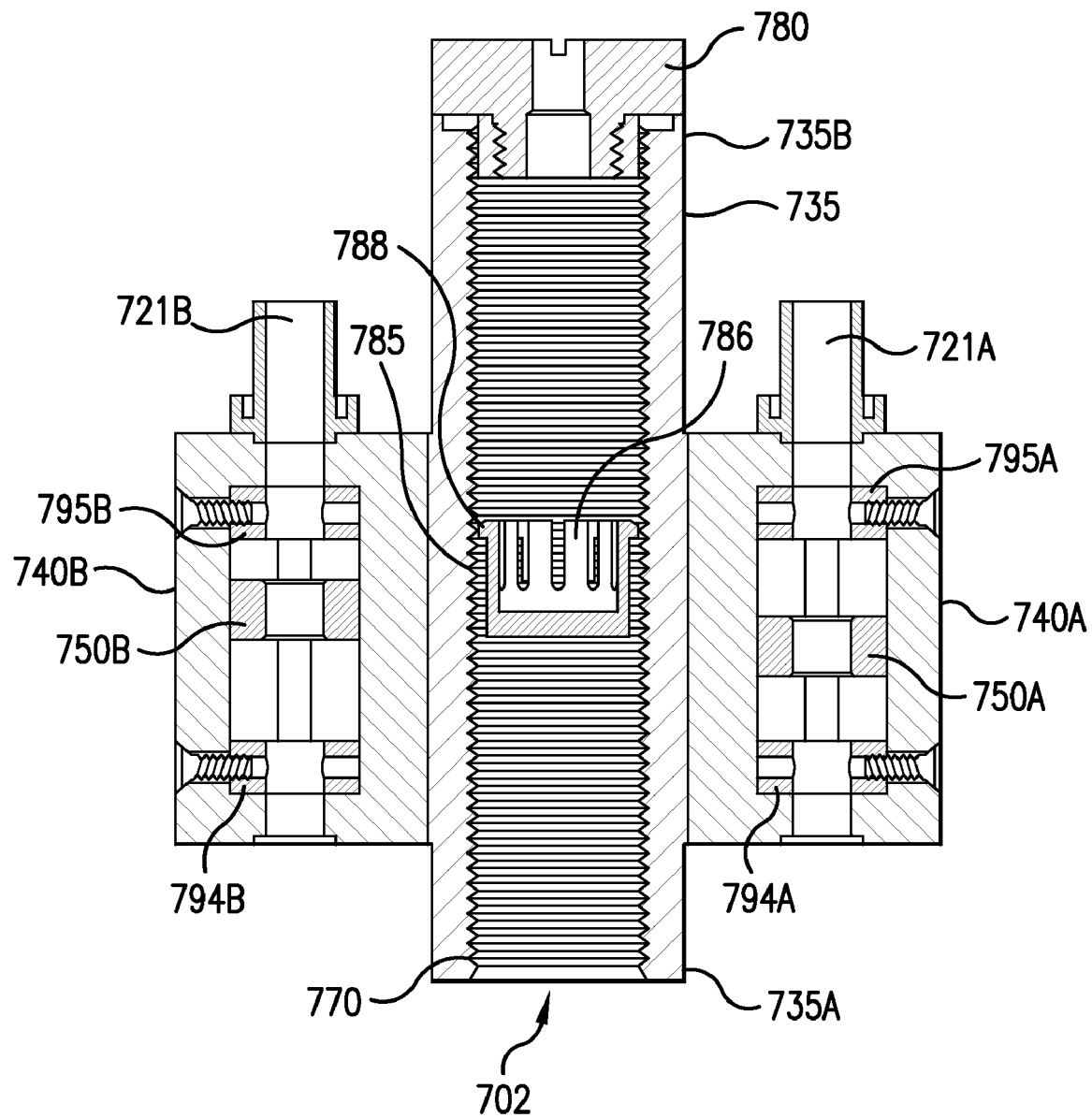

FIG. 7D is a cross sectional view of cylinder 735 and trigger brackets 740A and 740B of trigger assembly 700. As stated previously, internal cavity 702 has a plurality of spaced grooves 770 configured to receive extended portions 788 of plunger 785. The extended portions 788 engage the grooves 770 within the interior cavity 702 to provide a means for plunger 785 to grip the interior cavity 702, thereby preventing plunger 785 from moving. In addition, a retainer ring (not shown) may be incorporated toward end 735A of cylinder 735 to retain plunger 785 within cavity 702. When the actuator shaft reaches its full stroke distance within cavity 702 of cylinder 735, plunger 785 comes to rest within the cavity and extended portions 788 of teeth 786 provide an outward force against interior cavity 702 and engages at least one of the grooves 770. The grooves 770, may have, for example, a spacing of approximately 0.050" however; alternative spacing may be used depending on the type of actuator employed. Plunger 785 traverses upward in cavity 702 as the actuator rod engages plunger 785. The displacement of trigger assembly 700 along guide pins 721A and 721B (approximately ¼") plus the displacement of plunger 785 within cavity 735 equals the full actuator stroke distance. In this manner, the controller 10 self sets to the stroke range of a particular actuator. When a signal is sent to solenoid 420 to close the valve, the actuator rod moves vertically downward within cavity 702 and trigger assembly 700 is displaced the same distance downward as it moved upward during the self-setting cycle. However, plunger 785 remains in this position within cavity 702 corresponding to the completion of the full actuator stroke by the engagement of the extended portions 788 with the grooves.

After the self setting cycle is complete and the controller is used in operation, the movement of trigger assembly 700 provides the open and close signals via switches 733A and 733B and network card 710. A remote I/O card may also be used to communicate these operation signals. In particular, subsequent open and closing of the process valve (based on signals to and from solenoid 420 and the movement of air through cartridge 60) causes the actuator shaft to move upward into cylinder cavity 702. After the self setting cycle, plunger 785 is displaced a distance away from end 735A of cylinder 735 and may come to rest toward end 735B. Thus, the actuator shaft is free to move vertically upward towards plunger 785 within cavity 702. When the actuator shaft engages plunger 785 typically toward end 735B of cylinder 735 (depending on the length and stroke of the actuator shaft), plunger 785 again resists the upward force of the actuator shaft thereby moving the trigger assembly 700 (shown in FIG. 7B), which includes cylinder 735, upward the remaining ¼"-½" along guide pins 721A and 721B against bias springs 755A and 755B. Again, this displacement of assembly 700 also moves switch trigger 750A and 750B which activates switches 733A and 733B. On the upward or open actuator stroke, switch 733A is configured to send a signal to network card 710 that the valve is open. When the actuator shaft moves in the downward direction toward end 735A of cylinder 735 in response to a close signal, initially assembly 700 moves downward, switch 733*b* is configured to send a signal to network card 710 that the valve is closed. Accordingly, the placement of plunger 785 within cylinder 735 sets the actuator stroke without the need for mechanical connections between a controller and the actuator shaft. Depending on a particular actuator shaft and the length of the associated actuator stroke, triggers 750A and 750B may be adjusted using adjustment means 790A and 790B. As stated above, adjustment means 790A and 790B include adjustment rods 791A, 791B, bias springs 792A, 792B. When adjustment rods 791A and 791B are rotated, triggers 750A and 750B are vertically adjusted within brackets 740A and 740B. For example, when rod 791A is turned clockwise, trigger 750A moves vertically upward on threaded rod 791A. Likewise, when rod 791A is turned counter clockwise, trigger 750A moves vertically downward. This movement, upward or downward of trigger 750A adjusts the displacement of the trigger within the bracket 740A thereby altering when switch 733A is turned on and off. Similarly, when rod 791B is turned clockwise, trigger 750B moves vertically upward on threaded rod 791B. Likewise, when rod 791B is turned counter clockwise, trigger 750B moves vertically downward. This movement, upward or downward of trigger 750B adjusts the displacement of the trigger within bracket 740B thereby altering when switch 733B is turned on and off.

Figure 8:
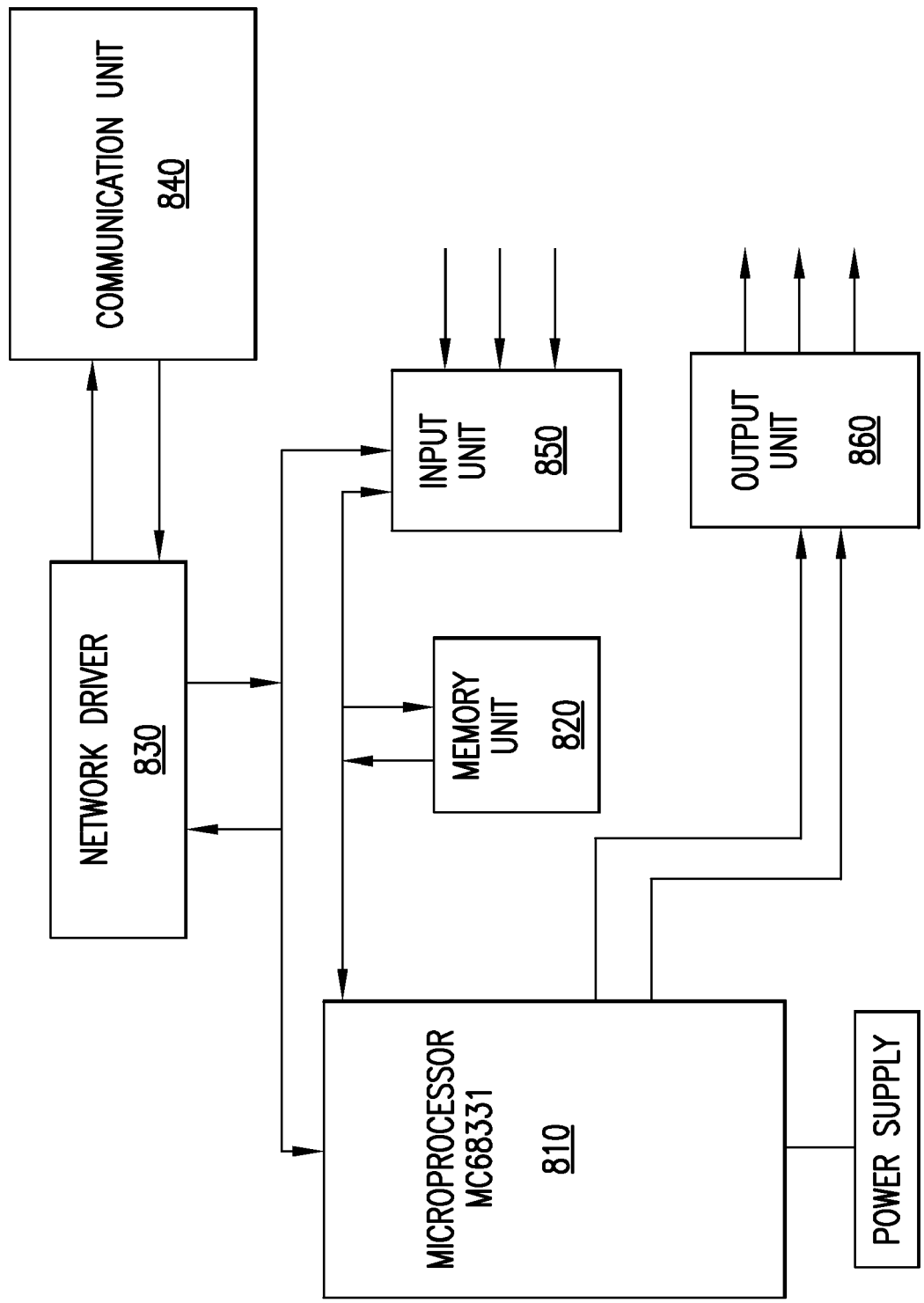
FIG. 8 is a block diagram of an exemplary embodiment of a communication card employed with the controller of the present invention.

Network card 710 may include wireless transceiver circuitry to transmit and receive information from controller 10 concerning actuator functionality and valve positioning. Alternatively, an I/O card may also be employed to communicate signals to and from controller 10. In an exemplary embodiment as shown in FIG. 8, card 710 includes a microprocessor 810, such as a Motorola MC68331, memory device 820, such as a FLASH memory, network driver 830, communication unit 840, input unit 850 and output unit 860. Input unit 850 may include an A/D converter to convert analog measured physical characteristics from the valve and/or actuator as inputs to microprocessor 810. Input unit 850 may also include a digital input interface to receive operating status of solenoid 420 and signals from switch triggers 750A and 750B. Communication unit 840 may include BLUE TOOTH communication capability, RS232 interface and HART modem capability to communicate various signals to an external communications device or controller. Memory 820 is configured to communicate with input unit 850 and microprocessor 810 to store detected operating characteristics. Output unit 860 may include a digital output interface to communicate control signals from microprocessor 810 to solenoid switch 420 and alarm indicators (not shown). In this manner, network card 710 is configured to transmit and receive control signals for valve controller 10.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A controller for controlling a valve actuator, the apparatus comprising:
   an enclosure;
   a cylinder, housed within said enclosure, having a vertical length and an internal cavity configured to receive a first end of an actuator shaft, said shaft vertically traversing at least a portion of the vertical length of said cylinder corresponding to an operating stroke of said actuator shaft in response to opening and closing of a valve;
   a plunger disposed within said cylinder and adapted to engage said first end of said actuator shaft, said plunger traversing a vertical distance within said internal cavity corresponding to the distance traversed by said actuator shaft within said cavity, said plunger engageable within said internal cavity about at least one of a plurality of grooves such that said vertical placement of said plunger within said internal cavity corresponds to the operating stroke of said actuator shaft;

wherein said plunger has a generally circular shape having a base and a plurality of teeth extending from said base, each of said teeth extending out from the perimeter of said base wherein each of said teeth are rigidly flexible to provide an outward retaining force from said base.

2. The controller in accordance with claim 1 further comprising:
an operating media distribution system disposed in said enclosure, the operating media distribution system including:
a manifold block having at least one cavity;
an operating media distribution cartridge including:
a cylinder positioned in said cavity and being exchangeable with respect to the manifold block; and
a spool assembly disposed in the cylinder and being displaceable between a first and a second configuration relative to the cylinder; and
an electronic control unit disposed in the enclosure, the electronic control unit operating an electromagnetic valve to control operating media flow in said operating media distribution system.

3. The apparatus of claim 2 wherein said manifold further comprises a plurality of ports which extend from an exterior surface of said block to an interior of said block.

4. The controller of claim 3 wherein said plurality of ports comprise a supply port, an energize port and an exhaust port.

5. The controller of claim 4 wherein said energize port communicates with said valve actuator and supplies operating media from said operating media cartridge to activate said actuator.

6. The controller of claim 4 wherein said supply port receives operating media from an external source.

7. The controller of claim 5 wherein said exhaust port receives said supply operating media from said operating media cartridge and allows said media to exit the controller.

8. The controller of claim 2 wherein said manifold block includes a first chamber adapted to house said electromagnetic valve used to allow supply media air to pass from a supply port to an energize port via said cartridge.

9. The controller of claim 8 further comprising a tube communicating with a valve switch at a first end and to said cartridge at a second end, said tube configured to allow operating media to pass there through.

10. The controller of claim 8 further comprising a tube communicating with said supply port at a first end and to a valve switch at a second end, said tube configured to allow operating media to pass therethrough.

11. The controller of claim 2 wherein said manifold block further comprises a centrally disposed aperture through which said actuator shaft traverses.

12. The controller of claim 2 wherein said manifold block further comprises a mounting plate for connecting said manifold block to said valve actuator.

13. The apparatus of claim 2 further comprising a trigger assembly mounted inside said enclosure and capable of vertical displacement within said enclosure, said assembly comprising:
a mounting bracket connected to said cylinder;
a trigger housed within said bracket;
at least one guide pin positioned through a first bore in said mounting bracket, a second bore vertically aligned with said first bore in said mounting bracket, and a hole through said trigger vertically aligned with said first and second bores; and
a mounting plate, positioned below said cylinder and said mounting bracket, adapted to threadedly receive said guide pin.

14. The controller of claim 13 wherein said mounting bracket is a first mounting bracket, said controller further comprising an electrical switch mounted within a second mounting bracket, said second mounting bracket fixedly attached to said mounting plate, said electrical switch communicating with said trigger such that displacement of said trigger assembly along said guide pin activates said switch.

15. The controller of claim 14 wherein movement of said plunger within said internal cavity of said cylinder has a first resistive force and displacement of said trigger assembly along said guide pin has a second resistive force, said first resistive force is greater than said second resistive force such that movement of said actuator shaft within said internal cavity displaces said trigger assembly before displacing said plunger.

16. The controller of claim 13 wherein said displacement of said trigger assembly is vertical movement.

17. The controller of claim 14 further comprising an electronic control unit mounted on said mounting plate, said control unit electrically communicating with said electrical switch to provide information concerning the activation and deactivation of said switch.

18. The controller of claim 14 further comprising an adjustment means attached to said first mounting bracket, said adjustment means used to adjust the position of said trigger within said first mounting bracket in relation to said electrical switch.

19. The controller of claim 14 wherein said trigger is a first trigger and said guide pin is a first guide pin, said trigger assembly further comprising:
a third mounting bracket connected to said cylinder;
a second trigger housed within said third bracket; and
a second guide pin positioned through a first bore in said third mounting bracket, a second bore vertically aligned with said first bore in said third mounting bracket, and a hole through said second trigger vertically aligned with said first and second bores, said second guide pin threadedly engages said mounting plate.

20. The controller of claim 19 wherein said switch is a first switch, said controller further comprising a second electrical switch mounted within said second mounting bracket, said second electrical switch communicating with said second trigger such that displacement of said trigger assembly along said first and second guide pins activates said switch.

21. The controller of claim 20 wherein said displacement of said trigger assembly is vertical movement.

22. The controller of claim 1 wherein said plurality of grooves are spaced along the length of said cylinder.

23. The controller of claim 1 wherein each of said teeth having outwardly extending portions which engage at least one of said plurality of grooves within said internal cavity of said cylinder.

24. The controller of claim 1 further comprising a beacon assembly indicating the position of a valve associated with said valve actuator, said beacon assembly comprising:
a vain indicator having a substantially conical shape and a central aperture, said vain positioned on said enclosure; and
a deflector having a substantially conical shape and a central aperture, said deflector positioned on top of and at least partially covering said vain such that rotation of said vain reveals an indicator portion of said vain.

25. The controller of claim 24 wherein said beacon assembly further comprises:
a cam housing attached to said vain around said central aperture;

a cam assembly adapted to engage a first end of said cylinder and at least a portion of which is disposed within said cam housing; and a dome having a substantially conical shape and positioned on top of and partially covering said deflector.

26. The controller of claim 25 wherein said vain indicator comprises a plurality of shields extending from said central aperture, each of said shields having a color easily noticeable by a human eye.

27. The controller of claim 24 wherein said deflector comprises a plurality of shields extending from said central aperture.

28. The controller of claim 25 wherein said cam assembly forces said vain indicator to rotate in response to an upward or downward vertical force applied to said cam assembly by said cylinder.

29. The controller of claim 28 wherein said cam assembly includes a cam portion having a substantially cylindrical shape and an inner and outer surface, said outer surface having a curved channel.

30. The controller of claim 29 wherein said cam assembly further comprising:

a drum having a first end, a second end, an outer wall, an inner cavity and at least one pin extending from said outer wall into said inner cavity; and a guide fixedly disposed within said drum and having a first end communicating with said first end of said drum such that displacement of said cam in an upward or downward direction causes said pin to traverse said curved channel and turns said drum which rotates said guide.

31. The controller of claim 2 wherein said spool assembly reciprocates along a longitudinal axis of said cartridge.

32. The controller of claim 2 wherein said cylinder of said operating media distribution cartridge concentrically circumscribes the spool assembly.

33. The controller of claim 9 wherein said cylinder of said operating media distribution cartridge further comprises at least one circumferential groove circumscribing the cartridge axis and adapted to receive said operating media from said tube and deliver said operating media to said spool assembly.

34. The controller of claim 5 wherein said cylinder of said operating media distribution cartridge further comprises at least one groove port oriented perpendicular to the axis of said cartridge, said groove port configured to receive operating media via said spool assembly and supply said media to said energize port.

35. The controller of claim 5 wherein said cylinder of said operating media distribution cartridge further comprises:

at least one longitudinal recess extending longitudinally along a portion of the cylinder, said longitudinal recess receiving operating media from said supply port; and a groove port oriented perpendicular to the axis of said cartridge and connected to said longitudinal recess, said groove port supplying operating media from said longitudinal recess to said spool assembly.

36. The controller of claim 2 wherein said cartridge has an inner surface, said spool assembly comprising:

a spool having a longitudinal axis extending parallel to a longitudinal axis of said cartridge, said spool having alternating large and small diameter bands circumscribing said longitudinal spool axis;

an annular sleeve circumscribing the spool, the sleeve having a plurality of radial perforations and a plurality of sleeve O-rings, each of said radial perforations and ones of said plurality of sleeve O-rings alternatingly disposed along said longitudinal cartridge axis; and a plurality of spacers circumscribing the annular sleeve, each of said spacers adapted to engage said inner surface of said cylinder.

37. The apparatus of claim 2, wherein said operating media distribution cartridge further comprises a resilient element biasing the spool assembly with respect to the cylinder.

38. The apparatus of claim 37, wherein the resilient element comprises a compression spring.

39. The apparatus of claim 2, wherein said operating media distribution cartridge comprises a cylinder cap engaging said cylinder and confining said spool assembly to reciprocating between said first and second configurations within said cylinder.

40. A controller for controlling a valve actuator, the apparatus comprising:

an enclosure including a cylinder having a length and an internal cavity configured to receive a first end of an actuator shaft, the actuator shaft for traversing at least a portion of the length of said cylinder corresponding to an operating stroke of the actuator shaft in response to opening and closing of a valve;

a plunger in the cylinder, the plunger adapted to engage the first end of the actuator shaft for traversing a distance within the internal cavity corresponding to the distance traversed by the actuator shaft within the cavity, the plunger engageable with the internal cavity via at least one of a plurality of grooves such that the location of the plunger within the internal cavity corresponds to the operating stroke of the actuator shaft; and a media distribution system in the enclosure, the media distribution system including:

a manifold block having a cavity;

a media distribution cartridge including a cylinder in the cavity, the cylinder exchangeable with the manifold block; and a spool assembly in the cylinder, the spool assembly displaceable between first and second configurations relative to the cylinder; and an electronic control unit operating a valve to control media flow in the media distribution system.

41. A controller for controlling a valve actuator, the apparatus comprising:

an enclosure including a cylinder having a length and an internal cavity configured to receive a first end of an actuator shaft, the actuator shaft for traversing at least a portion of the length of said cylinder corresponding to an operating stroke of the actuator shaft in response to opening and closing of a valve;

a plunger in the cylinder, the plunger adapted to engage the first end of the actuator shaft for traversing a distance within the internal cavity corresponding to the distance traversed by the actuator shaft within the cavity, the plunger engageable with the internal cavity via at least one of a plurality of grooves such that the location of the plunger within the internal cavity corresponds to the operating stroke of the actuator shaft; and a beacon assembly indicating the position of a valve associated with the valve actuator, the beacon assembly including a vain having a central aperture, the vain positioned on the enclosure; and a deflector having a central aperture, the deflector at least partially covering the vain indicator so that rotation of the vain reveals an indicator portion of the vain.

\* \* \* \* \*